United States Patent
Lee (10) Patent No.: US 7,511,777 B2
(45) Date of Patent: Mar. 31, 2009

(54) LIQUID CRYSTAL DISPLAY DEVICE WITH COMPENSATING PATTERNS ON CAPACITOR ELECTRODES

(75) Inventor: Joun Ho Lee, Daegu-kwangyokshi (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 10/189,769

(22) Filed: Jul. 8, 2002

(65) Prior Publication Data

US 2003/0016310 A1    Jan. 23, 2003

(30) Foreign Application Priority Data

Jul. 11, 2001    (KR) .................... 10-2001-0041671

(51) Int. Cl.
*G02F 1/1343* (2006.01)
(52) U.S. Cl. .................... 349/38; 349/39; 349/139
(58) Field of Classification Search ............ 349/33–38, 349/42–43, 139; 257/59, 72; 345/92
See application file for complete search history.

(56) References Cited

U.S. PATENT DOCUMENTS 5,032,536 A * 7/1991 Oritsuki et al. ............. 438/30
5,173,792 A * 12/1992 Matsueda ................... 349/54
5,734,455 A   3/1998 Yoshida et al.
6,172,728 B1 * 1/2001 Hiraishi ..................... 349/139
6,900,871 B1 * 5/2005 Song et al. ................. 349/139

FOREIGN PATENT DOCUMENTS

| CN | 1118077 A  | 3/1996 |
|----|------------|--------|
| JP | 02-059729  | 2/1990 |
| JP | 06-235938  | 8/1994 |
| JP | 2000002889 | 1/2000 |
| JP | 2001109016 | 4/2001 |

\* cited by examiner

*Primary Examiner*—David Nelms
*Assistant Examiner*—Hoan C Nguyen
(74) *Attorney, Agent, or Firm*—McKenna Long & Aldridge LLP

(57) ABSTRACT

LCD devices having automatic compensation for parasitic capacitance deviations caused by photolithography errors. Compensation is provided by compensation features on gate electrodes and on source/drain electrodes. Photolithography errors, which cause parasitic capacitance deviations, also cause compensating capacitance changes between the compensation features.

11 Claims, 5 Drawing Sheets

LIQUID CRYSTAL DISPLAY DEVICE WITH COMPENSATING PATTERNS ON CAPACITOR ELECTRODES

This application claims the benefit of the Korean Application No. 2001-41671, filed on Jul. 11, 2001, which is hereby incorporated by reference.

BACKGROUND OF THE INVENTION

1. Field of the Invention

The present invention relates to liquid crystal display (LCD) devices, and more particularly, to improving the image quality of LCD devices.

2. Discussion of the Related Art

Because of their advantages of low power consumption, lightweight, and small size, liquid crystal displays (LCDs) are highly attractive alternatives to cathode ray tubes (CRTs) in many applications.

An LCD device typically includes arrays of switching devices and pixel electrodes on an array substrate, a filter substrate having a common electrode, a color filter array and a black matrix, and a liquid crystal layer that is disposed between the array and filter substrates. The switching devices control the applications of signal voltages to the pixel electrodes. The pixel electrodes interact with the liquid crystal layer to selectively transmit light from pixel regions in response to the applied signal voltages. The array substrate further includes an array of storage capacitors for maintaining pixel information between applications of the signal voltages. The common electrode acts with the pixel electrodes to produce electric fields across the liquid crystal layer. The color filter layer colors the selectively transmitted light. The black matrix prevents light from entering regions where liquid crystal arrangement is not controllable.

Each storage capacitor maintains the signal voltage applied to a pixel electrode when the switching transistor (typically a thin film transistor) for that pixel electrode is turned-off. The purpose of the storage capacitor is to prevent picture quality deterioration. Storage capacitors are of a storage capacitance type or a supplemental capacitance type, with the distinction depending on how the capacitor electrodes are formed.

In the storage capacitance type, a distinct storage electrode is provided for each storage capacitor. In the supplement capacitance type, part of a gate line acts as a storage electrode. In general, LCD devices that use supplement capacitance type storage capacitors can have higher aperture ratios (because a separate storage electrode is not required) and typically have a higher fabrication yield (because of simplicity). However, LCD devices that use supplement capacitance type storage capacitors generally have relatively poor picture quality, at least partially because supplement capacitance type storage capacitors are not well suited to dot-inversion and column inversion drive systems.

On the other hand, LCD devices that use storage capacitor type storage capacitors often have lower aperture ratios, but better picture quality. Accordingly, LCD devices that use the storage capacitance type storage capacitors are better suited for video displays in which the low aperture ratio is acceptable.

Figure 1:
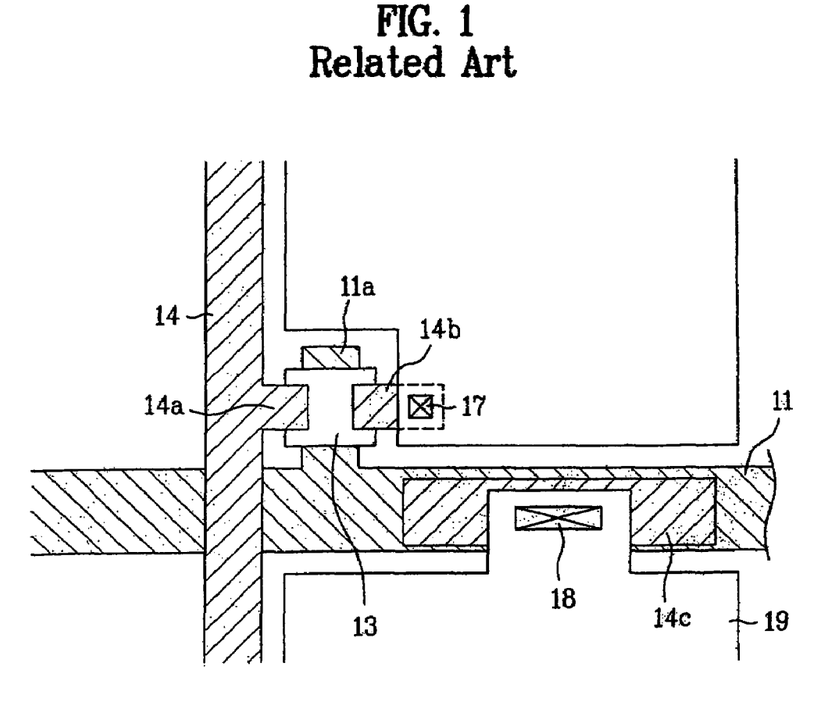
FIG. 1 is a top down view of a related art LCD.
Figure 2:
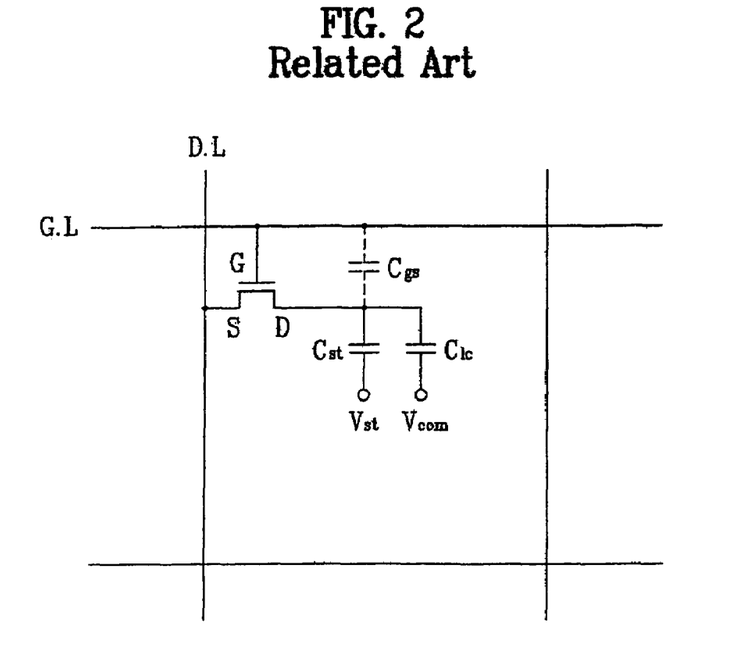
FIG. 2 is an equivalent circuit diagram of a pixel of the LCD of FIG. 1.

A related art LCD device that uses supplement capacitance type storage capacitors will be described with reference to FIG. 1 and to FIG. 2. FIG. 1 is a simplified schematic view of the related art LCD device, while FIG. 2 provides an equivalent circuit diagram of a pixel. That LCD device includes gate lines 11 that are formed on a first substrate, an insulating film (not shown) formed over the entire surface of the first substrate, including the gate lines 11, and data lines 14 that cross the gate lines 11 to define pixel regions. Upper capacitor electrode 14c, beneficially formed at the same time as the data lines, are located over the gate insulating film and over predetermined portions of the gate lines 11. Switching devices are located near crossings of the gate lines 11 and the data lines 14. A passivation film (not shown) having a predetermined thickness is beneficially formed over the entire surface of the first substrate, including over the switching devices. Pixel electrodes 19 of indium tin oxide (ITO) are connected to the switching devices and to the upper capacitor electrodes 14c through first and second contact holes 17 and 18.

Still referring to FIG. 1, predetermined portions of the gate lines 11 serve as lower capacitor electrodes. Accordingly, each storage capacitor includes an upper capacitor electrode 14c, part of a gate line 11, and the gate insulating film, which is interposed between the upper capacitor electrode 14c and the gate lines 11.

Referring now to FIG. 2, a parasitic capacitance Cgs results from the gate electrode G crossing the source/drain electrodes S/D. This parasitic capacitance induces a direct current (DC) voltage offset, Vp, when an AC voltage is applied to the liquid crystal. The DC voltage offset Vp results in undesirable effects, such as flicker, image "sticking," and uneven screen brightness. To solve such problems, the storage capacitor provides a storage capacitance Cst that improves picture quality by reducing changes in Vp. The storage capacitance Cst increases as the size of the storage capacitor electrode increases. However, if the storage capacitor electrode increases too much, the aperture ratio is reduced. Therefore, an optimal storage capacitor electrode size should be maintained.

Unfortunately, the overlap of the gate electrode 11a and the source/drain electrodes 14a and 14b may be vary because of photolithography errors. In that case, the parasitic capacitance can increase, and thus the desired Vp value cannot be obtained.

For reference, the remaining elements of FIG. 2 will be described. D.L denotes data lines 14, to which bipolar signal voltages are applied, while G.L denotes gate lines 11, to which scanning signals are applied. Clc denotes charge capacitance stored in the interval between a pixel electrode and the common electrode Vcom, while Cst denotes a charge capacitance stored in the interval between the predetermined part of the gate lines 11 and the upper capacitor electrode 14c.

Referring once again to FIG. 1, each switching device includes a gate electrode 11a that is diverged from a gate line 11, a gate insulating film (not shown, but located over the entire surface of the first substrate, including the gate lines 11), a semiconductor layer 13 on the gate insulating film and over the gate electrode 11a, and source/drain electrodes 14a and 14b at ends of the semiconductor layer 13. The switching device beneficially is an amorphous silicon thin film transistor (a-Si TFT).

To complete the LCD device, the array substrate, provided with the above elements, is attached to a color filter substrate having a black matrix, a red, green, and blue (R, G, B) color filter layer, and an ITO-based common electrode. A liquid crystal is disposed between the two attached substrates.

While generally successful, the related art LCD device has problems. Even though an effort is made to reduce changes in Vp by restraining the parasitic capacitance, Vp is not well controlled because of parasitic capacitance deviations. Such deviations can be caused by misalignment of the gate electrodes and the source/drain electrodes, which can occur because of process errors in critical dimensions (CD) and photolithography.

Large-screen display devices are particularly susceptible to capacitance problems because such displays are highly sensitive to flicker and/or picture brightness problems. Therefore, an LCD device that is compensated for parasitic capacitance deviations would be beneficial. Even more beneficial would be an LCD device that maintains a more uniform Vp.

SUMMARY OF THE INVENTION

Accordingly, the present invention is directed to a liquid crystal display device that substantially obviates one or more problems due to limitations and disadvantages of the related art.

An advantage of the present invention an LCD device having improved picture quality by automatically compensating for parasitic capacitance deviations so as to maintain a constant Vp.

To achieve this and other advantages and in accordance with the invention, as embodied and broadly described herein, an LCD according to the principles of the present invention includes adjacent first and second substrates, gate lines on the first substrate, data lines that cross the gate lines, thus defining pixel regions, capacitor electrodes over predetermined parts of the gate lines, thin film transistors formed near crossings of the gate lines and data lines, a pixel electrode in each pixel region, and a liquid crystal layer disposed between the first and second substrates. The gate lines have one or more first compensating patterns, while the capacitor electrodes have one or more second compensating patterns.

Often, a photolithography process is used to form the source/drain electrodes of the thin film transistors. Parasitic capacitance deviations that result from photolithography process errors are automatically compensated for by corresponding deviations in the first and second compensating patterns that change the capacitances of the storage capacitors. Thus, the storage capacitances automatically compensate for parasitic capacitance deviations.

The shapes of the first and second compensating patterns beneficially depend on the channel shapes of the thin film transistors. If the channels have an "I" or an "L" shape, the first and second compensating patterns are beneficially notched. If the channel has a "U" shape, the first and second compensating patterns beneficially have "U" shapes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to illustrated embodiments of the present invention, examples of which are shown in the accompanying drawings. Wherever possible, the same reference numbers will be used throughout the drawings to refer to the same or like parts.

Figure 3:
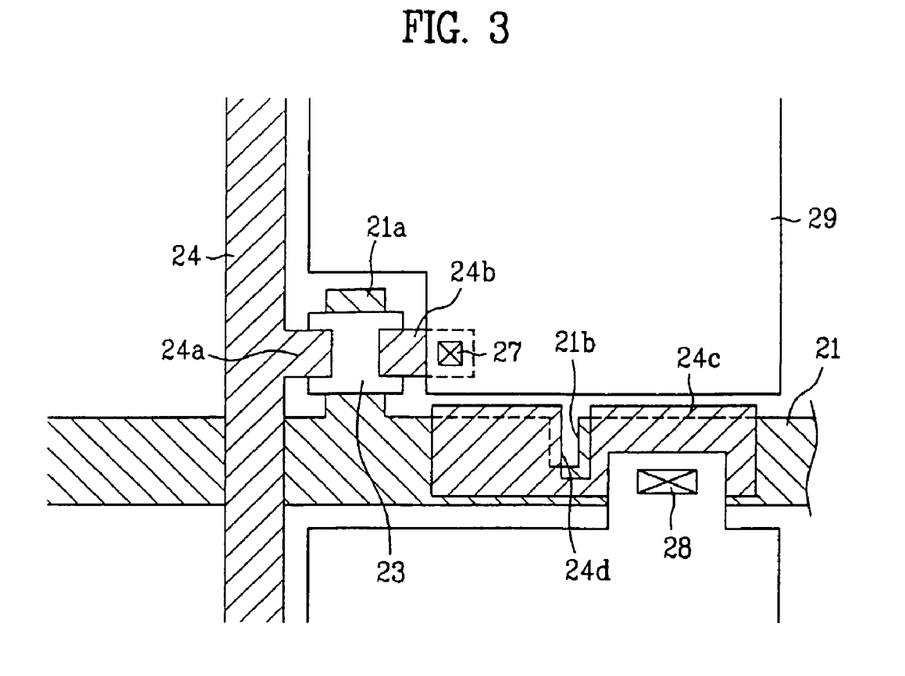
FIG. 3 is a top down view of an LCD device that is in accord with a first embodiment of the present invention.

FIG. 3 is a top down view of an LCD device that is in accord with a first embodiment of the present invention. Specifically, FIG. 3 shows an LCD that uses a supplement capacitance type storage capacitor. That LCD device includes array and color filter substrates and an interposed liquid crystal layer. A black matrix for preventing light leakage, and a red, green, and blue (R,G,B) color filter layer for selectively transmitting light to display colors are formed on the color filter substrate. A common electrode of ITO is also formed on the color filter substrate.

Referring now to FIG. 3, gate lines 21 are formed on the array substrate. Those gate lines have one or more first compensating patterns (described in more detail subsequently). A gate insulating film (not shown) is formed over the entire surface of the array substrate, including over the gate lines 21, by depositing an inorganic insulating film such as $SiN_x$ and/or $SiO_x$. Data lines 24 cross the gate lines 21, thus defining pixel regions. Thin film transistors are formed near the crossings of the gate and data lines 21 and 24. Each thin film transistor includes a gate electrode 21a, and source/drain electrodes 24a and 24b. Upper capacitor electrodes 24c, each having one or more second compensating patterns, are formed at the same time as the data lines 24 and the source/drain electrodes 24a and 24b. The upper capacitor electrodes 24c are located over predetermined parts of the gate lines 21. A passivation film (not shown) is formed over the entire surface of the array substrate, including over the thin film transistor, by depositing an organic insulating film of BCB and/or acrylic resin, or by depositing an inorganic insulating film, such as SiNx and/or SiOx. In any event, the passivation film has a predetermined thickness. A pixel electrode 29, beneficially made of ITO, is connected to each thin film transistor and to an adjacent upper capacitor electrode 24c by way of first and second contact holes 27, 28 that are formed by selectively etching the passivation film.

Each thin film transistor includes a gate electrode 21a (which diverges from a gate lines 21), a gate insulating film (not shown, but which is formed over the entire surface of the substrate, including the gate lines 21), an island shaped semiconductor layer 23 on the gate insulating film and over the upper gate electrode 21a, and source/drain electrodes 24a and 24b at ends of the semiconductor layer 23. As shown, the channel formed by the semiconductor layer 23 has an "I" shape.

The gate lines 21 and data lines 24 are beneficially formed by depositing a low resistant metal, such as Al, Cu, W, Mo, Ti, Ta, and Al, by sputtering, and then patterning using a photolithography process.

Storage capacitors are included to reduce voltage drops due to parasitic capacitances between crossing portions of the gate electrodes 21a and the source/drain electrodes 24a and 24b. Each storage capacitor include part of a gate line 21 (which serves as a lower capacitor electrode), an upper capacitor electrode 24c, and a gate insulating film that is interposed between the gate line 21 and the upper capacitor electrode 24c.

Still referring to FIG. 3, notch shaped first compensating patterns 21b are formed on the gate lines 21, and notch shaped second compensating patterns 24d are formed on the upper capacitor electrodes 24c. The compensating patterns 21b and 24d help maintain a constant (uniform) Vp by compensating for parasitic capacitance deviations caused by misalignment between the gate electrodes 21a and the source/drain electrodes 24a and 24b that result from photolithography errors. In other words, as the overlap of a gate electrode 21a and source/drain electrodes 24a and 24b changes, so does the overlap of the first compensating pattern 21b and the second compensating pattern 24d, but in a manner that automatically compensates the storage capacitance for changes in the parasitic capacitance. As shown, the notched first and second compensating patterns 21b and 24d are located such that the second compensating patterns 24d partially overlap the first compensating patterns 24d.

The structure of the first and second compensating patterns is devised by taking into consideration that in an "I"-shaped thin film transistor, the overlap of the gate electrode 21a and the source/drain electrodes 24a and 24b does not change much by a vertical shift, but changes significantly due to side-to-side shifts.

Also, each storage capacitor includes part of a gate line 21, an upper capacitor electrode 24c, and an interposed insulating film 22. Charges are stored in the storage capacitor by voltage applied to the gate lines 21 and by signal voltages applied to the upper capacitor electrode 24c from the data lines 24.

As shown in formula (1), the parasitic capacitance Cgs is highly influential on Vp. Furthermore, Cgs is closely related to the characteristics of the panel, and is very important to picture quality.

$$Vp = \frac{Cgs}{Cgs + Cst + Clc} Vg \quad (1)$$

Accordingly, if the parasitic capacitance Cgs in a pixel is different, the DC voltage offset Vp in that pixel is also different. Such voltage changes can cause problems, such as flicker and afterimages. Therefore, the first and second compensating patterns 21b and 24d are included to make Vp substantially constant by compensating for changes in the parasitic capacitance Cgs.

In the first and second compensating patterns 21b and 24d, if the parasitic capacitance Cgs increases, the storage capacitor capacitance increases, and if the parasitic capacitance decreases, the storage capacitor capacitance decreases. Thus, the following formula (2) can be expressed.

$$Vp = \frac{Cgs + Cgs}{(Cgs + Cgs) + (Cst + Cst) + Clc} Vg \quad (2)$$

The method of using part of the gate lines 21 as storage capacitor electrodes is a characteristic of supplement capacitance type storage capacitors. A separate electrode for the storage capacitor is not necessary.

Figure 4:
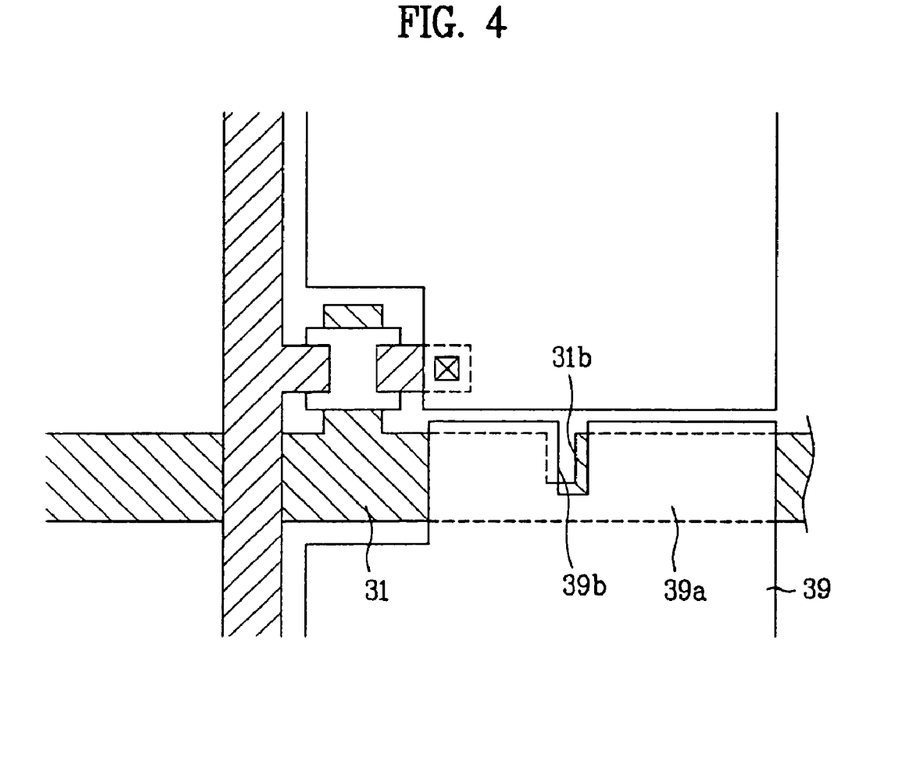
FIG. 4 is a top down view of an LCD device that is in accord with a second embodiment of the present invention.

Meanwhile, the technical features of the present invention can be applied not only to devices in which the upper capacity electrodes 24c are electrically connected to pixel electrodes 29, but, as shown in FIG. 4, to devices in which an integral body forms each upper capacitor electrode 39a and each pixel electrode 39.

As shown in FIG. 4, storage capacitors in accord with a second embodiment of the present invention include gate lines 31 that have first compensating patterns 31b and which serve as lower capacitor electrodes, upper capacitor electrodes 39a that have second compensating patterns 39b which partially overlap the first compensating patterns 31b, and an insulating film (comprised of a gate insulating film and a passivation film) interposed between the gate lines 31 and the upper capacitor electrode 39a. The storage capacitors automatically change storage capacitances to compensate for parasitic capacitance deviations such that Vp is maintained constant.

Both the first and second compensating patterns 31b and 39b are notches, with the second compensating patterns 39b being notched deeper than the first compensating patterns 31b (which is wider).

Figure 5:
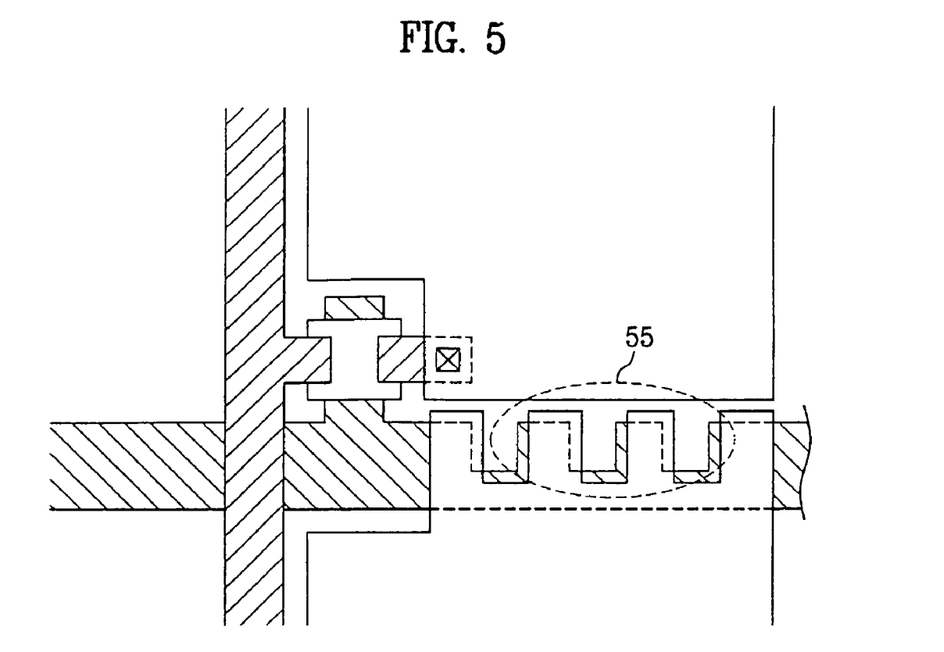
FIG. 5 is a top down view of an LCD device that is in accord with a third embodiment of the present invention.

Though FIGS. 3 and 4 show one set of compensating patterns, FIG. 5 illustrates a plurality of sets of compensating patterns 55.

The principles of the present invention are applicable with "L" and "U"-shaped TFTs, as well as with "I"-shaped TFTs. "L" and "U"-shaped TFTs have improved control of flicker and afterimages as a result of reduced overlaps of gate lines and source/drain electrodes. In particular, the "U"-shaped TFT represents a considerably improved structure in controlling Vp changes caused by pattern misalignment of the upper and lower layers because of photolithography errors.

However "L" or "U"-shaped TFTs remain susceptible to Vp changes caused by parasitic capacitance deviations. Thus, the technical features of the present invention can also benefit "L" or "U"-shaped TFTs. Beneficially, the compensating patterns used with "L" and "U"-shaped TFTs are somewhat different.

Figure 6:
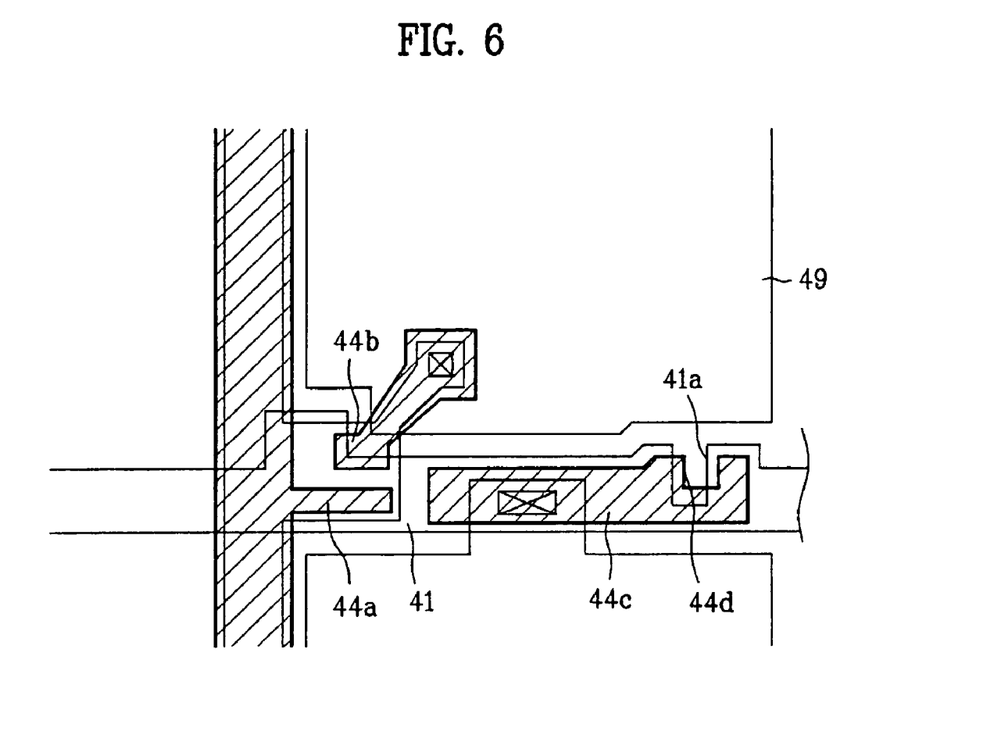
FIG. 6 is a top down view of an LCD device that is in accord with a fourth embodiment of the present invention.

FIG. 6 shows an "L"-shaped TFT. The first compensating patterns 41a on the gate lines 41 and the second compensation patterns 44d on the upper capacitor electrodes 44c take the form of partially overlapping notches (with the second notch being narrower than the first notch). If a parasitic capacitance Cgs increases because the source/drain electrodes 44a and 44b are shifted by photolithography, the storage capacitance Cst increases because of a resulting change in overlap between a first compensating pattern 41a and a second compensating pattern 44d.

Figure 7:
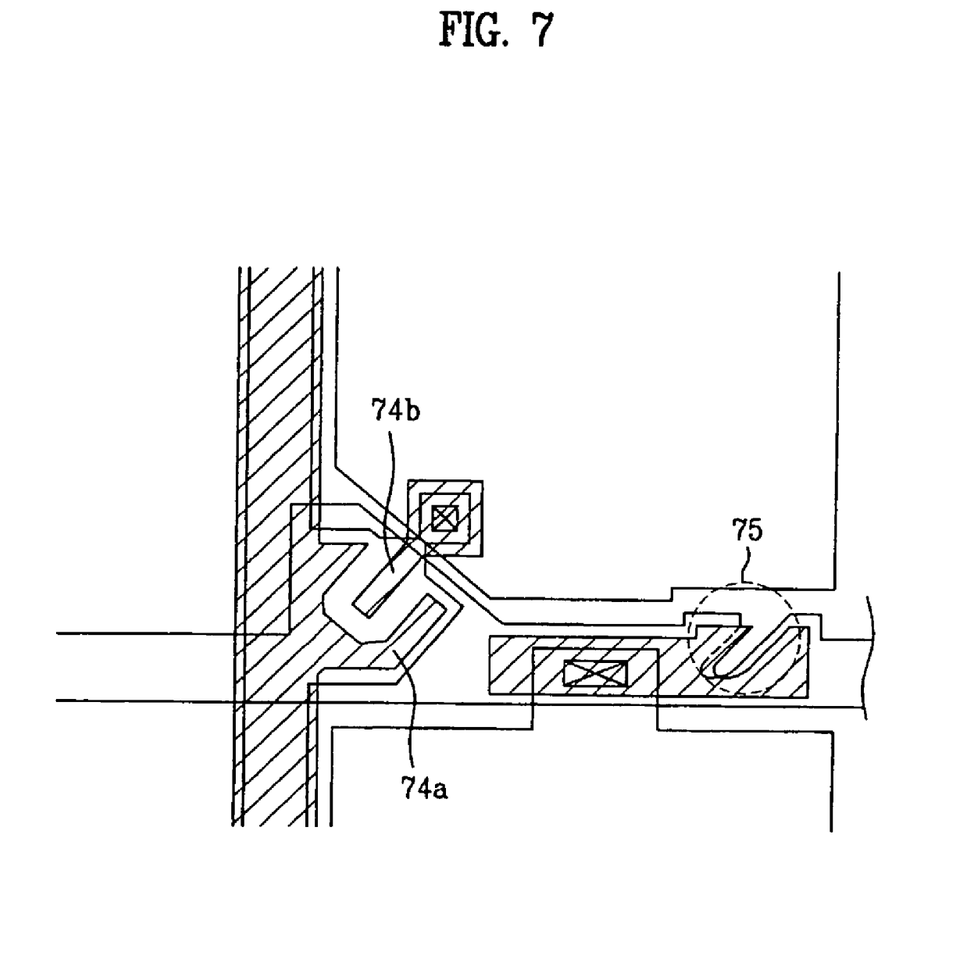
FIG. 7 is a top down view of an LCD device that is in accord with a fifth embodiment of the present invention.

Referring now to FIG. 7, with a "U"-shaped TFT, the first and second compensating patterns, in the area 75, partially overlap and are beneficially "U" shaped. Since the parasitic capacitance Cgs of a "U"-shaped TFT is not changed significantly by a side-to-side shift of the source/drain electrodes 74a and 74b, but is significantly changed by a 45° shift, the compensating patterns are modified to significantly compensate for changes caused by 45° shifts. However, the present invention is useful with not only "U"-shaped TFTs having 45° channels, but also with "U"-shaped TFTs having 0° or 90° channels.

The aforementioned storage capacitor structures are of the supplement capacitance type, which uses part of the gate lines as lower capacitor electrodes. However, the technical features of the present invention can also be used with the storage capacitance types, which have separate lower capacitor electrodes.

Figure 8:
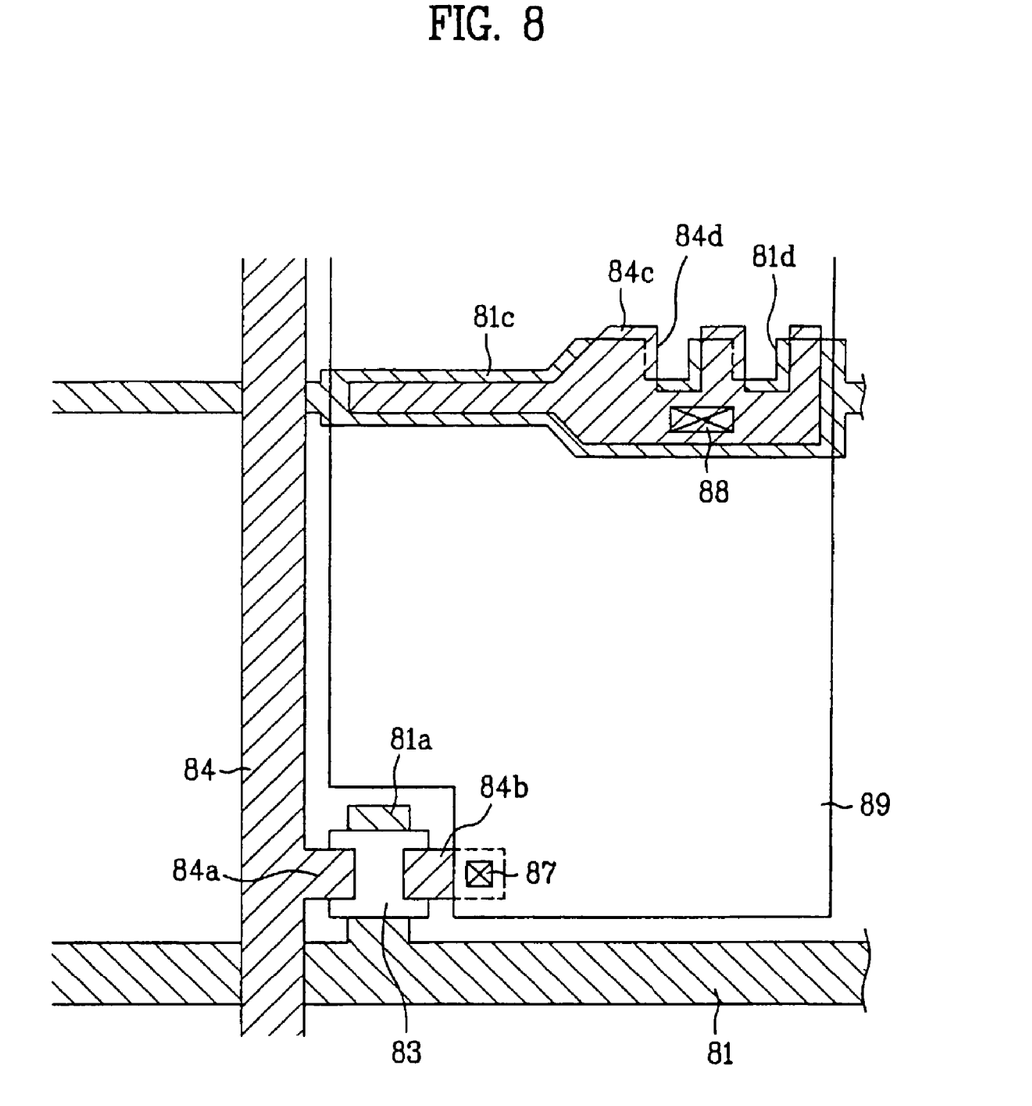
FIG. 8 is a top down view of an LCD device that is in accord with a sixth embodiment of the present invention.

Referring now to FIG. 8, an LCD device that uses storage capacitance type storage capacitors includes gate lines 81, lower capacitor electrodes 81c, data lines 84, upper capacitor electrodes 84c, thin film transistor, a passivation film (not shown), and pixel electrodes 89. The gate lines 81 are formed on an array substrate. The lower capacitor electrodes 81c are formed parallel to the gate lines 81 and have one or more first compensating patterns 81d. The data lines 84 cross the gate lines 81 to define pixel regions. The upper capacitor electrodes 84c are formed over predetermined portions of the lower capacitor electrodes 81c and have one or more second compensating patterns 84d. The thin film transistors are formed near crossings of the gate and data lines 81 and 84. The passivation film (not shown) is formed over the entire surface of the substrate, including over the thin film transistors. Each pixel electrode 89 is connected to a thin film transistor and to an upper capacitor electrode 84c through first and second contact holes 87 and 88 that are formed by selectively eliminating the passivation film.

The lower capacitor electrodes 81c are beneficially formed at the same time as the gate lines 81, and the upper capacitor electrodes 84c are beneficially formed at the same time as the data lines 84 and source/drain electrodes 84a and 84b. Both the lower and upper capacitor electrodes are beneficially formed by depositing low resistant metals, such as Al, Cu, W, Mo, Ti, Ta, and Al, by a sputtering process, and then by patterning using a photolithography process.

The upper and lower capacitor electrodes 81c and 84c have a gate insulating film interposed between them. The gate insulating film serves as part of the storage capacitor. The first and second compensating patterns 81d and 84d provided in the upper and lower capacitor electrodes 81c and 84c help maintain the Vp of each pixel constant (uniform) by compensating for parasitic capacitance deviations of that pixel. Thus, screen problems such as flicker and afterimages can be reduced.

The thin film transistors each include a gate electrode 81a, a gate insulating film (not shown), a semiconductor layer 83, and source/drain electrodes 84a and 84b. A thin film transistor can have three different shapes (i.e., an "I"-shaped TFT, an "L"-shaped TFT, and a "U"-shaped TFT) according to different channel structures produced by the gate electrode 81a and the source/drain electrodes 84a and 84b. Beneficially, the compensating patterns 81d and 84d take the same shape as the TFT channel pattern.

As aforementioned, the LCD device has advantages.

First, the compensating patterns compensate for parasitic capacitance deviations to maintain a uniform Vp. This reduces problems such as flicker, afterimages, and uneven screen brightness, leading to improved picture quality.

Second, better picture quality makes large area LCD devices more attractive, which increases the potential markets.

Third, picture quality deterioration that was not completely solved by "L"-shaped or "U"-shaped TFTs, is reduced.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A liquid crystal display (LCD) device, comprising:
   a first substrate and an adjacent second substrate;
   a plurality of gate lines formed on the first substrate, wherein each gate line includes a plurality of first compensating patterns;
   a plurality of data lines that cross the gate lines, thereby defining a plurality of pixel regions such that each pixel region is adjacent a first compensating pattern;
   a capacitor electrode in each pixel region on a gate line, wherein each capacitor electrode includes a second compensating pattern;
   an insulating film interposed between each capacitor electrode and each gate line;
   a plurality of thin film transistors, each having a gate electrode and source/drain electrodes and each adjacent a crossing of a gate line and a data line;
   a pixel electrode in each pixel region; and
   a liquid crystal layer disposed between the first and second substrates,
   wherein the first and second compensating patterns include recesses that correspond to a channel shape of the thin film transistor, wherein at least one of first recess of the first compensating pattern and at least one of second recess of the second compensating pattern overlap each other, wherein the second recess of the second compensating patterns are deeper than the first recess of the first compensating patterns and
   wherein each first compensating pattern and each second compensating pattern partially overlap each other.

2. The LCD device of claim 1, wherein each capacitor electrode is electrically connected to a pixel electrode.

3. The LCD device of claim 1, wherein each first compensating pattern overlaps a second compensating pattern.

4. The LCD device of claim 1, wherein each thin film transistor is electrically connected to a pixel electrode.

5. The LCD device of claim 1, wherein the second compensating patterns are wider than the first compensating patterns.

6. An LCD device, comprising:
   crossing gate and data lines on a first substrate and that define a pixel region;
   a lower capacitor electrode in the pixel region having a first compensating pattern;
   an upper capacitor electrode having a second compensating pattern over the first compensating pattern;
   an insulating film between the lower and upper capacitor electrodes;
   a thin film transistor adjacent a crossing of the gate line and the data line, the thin film transistor including a gate electrode and source/drain electrodes;
   a pixel electrode in the pixel region that is electrically connected to the thin film transistor and to the upper capacitor electrode; and
   a liquid crystal layer over the first substrate,
   wherein the first and second compensating patterns include recesses that correspond to a channel shape of the thin film transistor, wherein at least one of first recess of the first compensating pattern and at least one of second recess of the second compensating pattern overlap each other, wherein the second recess of the second compensating patterns are deeper than the first recess of the first compensating patterns and
   wherein the first compensating pattern and the second compensating pattern partially overlap each other.

7. The LCD device of claim 6, wherein the lower capacitor electrode is parallel to the gate lines.

8. The LCD device of claim 6, wherein the lower capacitor electrode is comprised of the same material as the gate lines.

9. The LCD device of claim 6, wherein the upper capacitor electrode is comprised of the same material as the source/drain electrodes.

10. The LCD device of claim 6, wherein the second compensating pattern is wider than the first compensating pattern.

11. The LCD device of claim 6, wherein the second compensating pattern is narrower than the first compensating pattern.

* * * * *